(12) United States Patent
Veitch (10) Patent No.: US 12,415,609 B2
(45) Date of Patent: Sep. 16, 2025

(54) HYBRID AIRCRAFT POWER PLANT

(71) Applicant: PRATT & WHITNEY CANADA CORP., Longueuil (CA)

(72) Inventor: Thomas Veitch, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/439,070

(22) Filed: Feb. 12, 2024

(65) Prior Publication Data
US 2025/0256855 A1 Aug. 14, 2025

(51) Int. Cl.
*B64D 27/33* (2024.01)
*B64D 27/02* (2006.01)
*B64D 35/022* (2025.01)

(52) U.S. Cl.
CPC ............ *B64D 27/33* (2024.01); *B64D 27/02* (2013.01); *B64D 35/022* (2024.01)

(58) Field of Classification Search
CPC ...... B64D 27/33; B64D 35/022; B64D 27/02; B64D 27/24
See application file for complete search history.

(56) References Cited

U.S. PATENT DOCUMENTS

| | | | |
|---|---|---|---|
| 10,822,100 B2 | 11/2020 | Dindar et al. | |
| 11,313,282 B2 | 4/2022 | Maljean | |
| 2013/0062463 A1 | 3/2013 | Lord | |
| 2020/0354068 A1* | 11/2020 | Razak | B64D 27/24 |
| 2021/0071585 A1* | 3/2021 | Kupratis | B64D 27/33 |
| 2021/0140367 A1* | 5/2021 | Tantot | F01D 15/10 |
| 2021/0317800 A1 | 10/2021 | Yesilcimen et al. | |
| 2021/0347490 A1* | 11/2021 | Landers | B60L 53/00 |

OTHER PUBLICATIONS

Extended European Search Report dated Jul. 16, 2025, EP25157479.4-1009/4600477.

* cited by examiner

*Primary Examiner* — Rodney A Bonnette
(74) *Attorney, Agent, or Firm* — NORTON ROSE FULBRIGHT CANADA LLP (57) ABSTRACT

An aircraft power plant, comprising: a fan for providing power to an aircraft; a gas turbine engine located on a first axial side of the fan, the gas turbine engine having a compressor drivingly engaged by a turbine via an engine shaft; an electric motor powered by a power source, the electric motor driving a motor shaft; and a gearbox located on a second axial side of the fan opposite the first axial side, the gearbox in driving engagement with the engine shaft, the motor shaft, and the fan, the gearbox defining a first load path between the gas turbine engine and the fan and a second load path between the electric motor to the fan, the fan in continuous driving engagement with both of the gas turbine engine and the electric motor along the first load path and the second load path.

19 Claims, 7 Drawing Sheets

FIG. 9

HYBRID AIRCRAFT POWER PLANT

TECHNICAL FIELD

The present disclosure relates generally to aircraft power plants and, more particularly, to hybrid aircraft power plants combining power generated by thermal combustion engines and electric motors.

BACKGROUND

Hybrid electric aircraft propulsion systems combine thermal combustion and electric propulsion technologies. In an electric propulsion system, electrical energy from an electric motor is converted to mechanical energy to drive a rotor, such as a prolusion fan, a propeller, a helicopter rotor, and so on. There are environmental and cost benefits to having at least a portion of the power for an aircraft propulsion system to come from one or more electric motor.

SUMMARY

In one aspect, there is provided an aircraft power plant, comprising: a fan for providing power to an aircraft; a gas turbine engine located on a first axial side of the fan relative to a central axis of the gas turbine engine, the gas turbine engine having a compressor drivingly engaged by a turbine via an engine shaft; an electric motor powered by a power source, the electric motor driving a motor shaft; and a gearbox located on a second axial side of the fan opposite the first axial side, the gearbox in driving engagement with the engine shaft, the motor shaft, and the fan, the gearbox defining a first load path between the gas turbine engine and the fan and a second load path between the electric motor to the fan, the fan in continuous driving engagement with both of the gas turbine engine and the electric motor along the first load path and the second load path.

The aircraft power plant as defined above and described herein may also include any one or more of the following features, in whole or in part, and in any combination.

In some embodiments, the first axial side corresponds to a downstream side of the fan relative to an airflow through the fan, the second axial side corresponding to an upstream side of the fan relative to the airflow.

In some embodiments, a duct extends circumferentially around both of the fan and the gas turbine engine.

In some embodiments, the gearbox is a planetary gearbox having a sun gear, planet gears meshed with the sun gear and rollingly supported by a planet carrier, and a ring gear meshed with the planet gears.

In some embodiments, the engine shaft is drivingly engaged to the planet carrier, the motor shaft is drivingly engaged to the sun gear, and the fan is drivingly engaged by the ring gear.

In some embodiments, the power plant has a first configuration in which the electric motor is in a generator mode, the gas turbine engine driving both of the electric motor and the fan in the first configuration along the first load path and the second load path; and a second configuration in which the electric motor is in a propelling mode, the gas turbine engine and the electric motor conjointly driving the fan in the second configuration and the first load path and the second load path.

In some embodiments, the gas turbine engine is a single spool engine.

In some embodiments, the electric motor is located on the second axial side of the fan.

In some embodiments, the gearbox is located axially between the electric motor and the fan.

In another aspect, there is provided an aircraft comprising: a fuselage having a skin enclosing an internal volume of the fuselage, the fuselage having a tail section, the skin defining an air intake within the tail section; a power plant located within the tail section, the power plant having: a fan for providing power to the aircraft, the fan in fluid flow communication with the air intake of the tail section; a gearbox drivingly engaged with the fan; a gas turbine engine drivingly engaged with the gearbox and in fluid flow communication with the air intake of the tail section; an electric motor drivingly engaged with the gearbox; and wherein the fan is driven by one or more of the gas turbine engine and the electric motor through the gearbox.

The aircraft as defined above and described herein may also include any one or more of the following features, in whole or in part, and in any combination.

In some embodiments, the tail section defines an intake conduit extending from the air intake to the fan, the intake conduit curving from the air intake to the fan.

In some embodiments, the tail section has an opening at a rear end thereof, the gas turbine engine and the fan in fluid flow communication with the opening.

In some embodiments, the tail section has a converging portion that extends towards a longitudinal axis of the fuselage, the air intake located within the converging portion.

In some embodiments, the gearbox and the electric motor are located forward of the fan relative to a direction of travel of the aircraft.

In some embodiments, the gearbox is a planetary gearbox having a sun gear, planet gears meshed with the sun gear and rollingly supported by a planet carrier, and a ring gear meshed with the planet gears.

In some embodiments, the gas turbine engine is drivingly engaged to the sun gear, the electric motor is drivingly engaged to the planet carrier, and the fan is drivingly engaged by the ring gear.

In some embodiments, the gas turbine engine is a single spool engine.

In some embodiments, secondary propulsors are mounted to the tail section of the fuselage.

In some embodiments, the secondary propulsors are ducted fans each drivingly engaged by a respective electric motor.

In some embodiments, the power plant has: a first configuration in which the electric motor is in a generator mode, the gas turbine engine driving both of the electric motor and the fan in the first configuration; and a second configuration in which the electric motor is in a propelling mode, the gas turbine engine and the electric motor conjointly driving the fan in the second configuration.

BRIEF DESCRIPTION OF THE DRAWINGS

Reference is now made to the accompanying figures in which.

DETAILED DESCRIPTION

Figure 1:
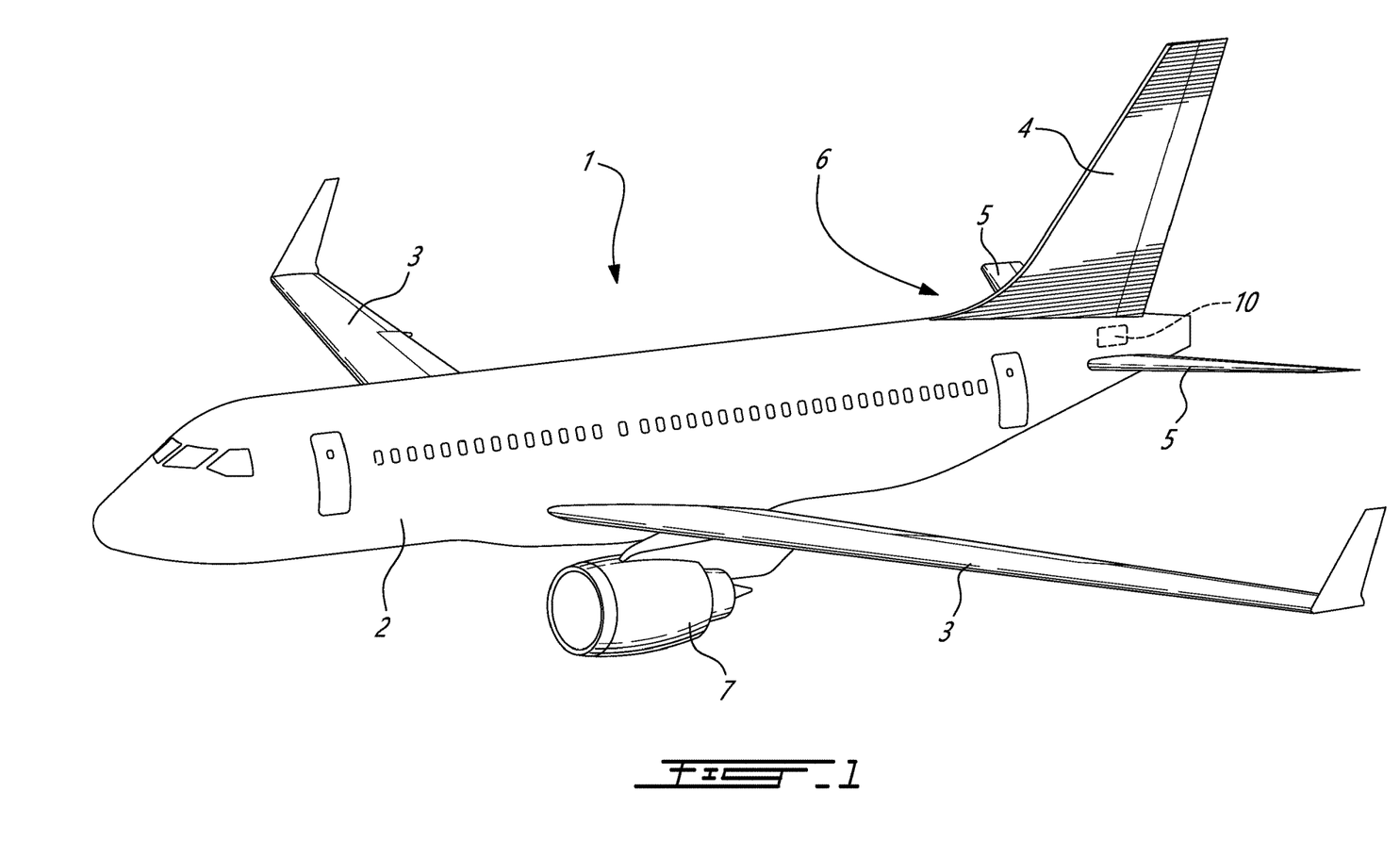
FIG. 1 is a schematic three dimensional view of an aircraft in accordance with one embodiment.

Referring now to FIG. 1, an aircraft is shown generally at 1 an includes a fuselage 2, wings 3 protruding from the fuselage 2, a vertical stabilizer 4 and a horizontal stabilizer 5 both protruding from a tail section 6 of the fuselage 2. The aircraft 1 further includes engines 7 mounted underneath the wings 3. It will be appreciated that the engines 7 may be mounted to the tail section 6 of the fuselage 2 of the aircraft 1.

Figure 2:
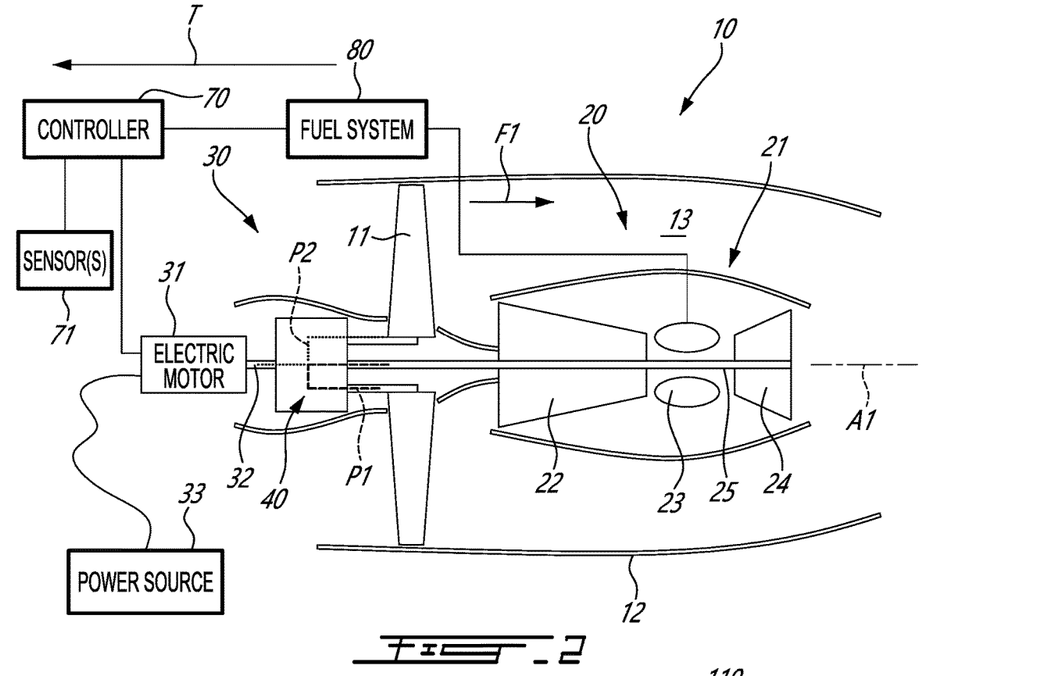
FIG. 2 is a schematic cross-sectional view of an aircraft power plant in accordance with one embodiment to be used with the aircraft of FIG. 1.

Referring now to FIG. 2, an aircraft power plant to be used with the aircraft of FIG. 1 is shown generally at 10. The aircraft power plant 10 is a hybrid power plant and includes a thermal module 20 and an electric module 30. Both of the thermal module 20 and the electric module 30 are used to conjointly drive a propulsor of the aircraft power plant 10.

In the embodiment shown, the aircraft power plant includes a fan 11 used as a propulsor to create thrust to propel the aircraft 1. The fan 11 is enclosed within a duct 12. The thermal module 20 is located within the duct 12. Put differently, the duct 12 circumferentially surrounds the fan 11 and the thermal module 20. The fan 11 may be referred to as a ducted fan. The duct 12 therefore extends circumferentially around a central axis A1 and axially overlaps both of the fan and the thermal module 20 relative to the central axis A1. As shown in FIG. 2, the aircraft power plant 10 defines a bypass conduit 13 located radially between the thermal module 20 and the duct 12. The aircraft power plant 10 therefore defines a bypass flow path extending annularly around the thermal module 20 and a core flow path extending through the thermal module 20.

In the embodiment shown, the thermal module 20 is a thermal combustion engine, and more particularly a gas turbine engine 21 including a compressor 22, a combustor 23 located downstream of the compressor 22 relative to a flow through the gas turbine engine 21, and a turbine 24 located downstream of the combustor 23. In this configuration, the gas turbine engine 21 is a single spool turbofan engine, in that the compressor 22 and the turbine 24 are engaged to one another via single shaft 25. The shaft 25 rotates about the central axis A1, which also corresponds to a central axis of the gas turbine engine 21.

Turbofan engines may present challenges. For instance, it may be more optimal to have the fan 11 spinning at a much lower angular speed than the turbine 24 powering it. Also, a turbofan engine is typically sized to produce a required thrust for take-off and climb to meet aircraft performance requirements. This implies that the engine is oversized for the majority of the aircraft mission. The disclosed aircraft power plant 10 may at least partially alleviate these drawbacks.

The electric module 30 includes an electric motor 31 drivingly engaged to a gearbox 40 via a motor shaft 32. The gearbox 40 may be configured to permit the shaft 25 of the gas turbine engine 21 to rotate at a lower speed than the fan 11. The electric motor 31 is powered by a power source 33, which may be a battery pack or a generator or a combination of both. The electric motor 31 is sized to be able to provide torque to the fan 11 such that a non-negligible portion of the power provided to the fan 11 comes from the electric motor 31. Put differently, while the aircraft 1 is in cruise at a cruise altitude above a ground, the electric motor 31 may be able to provide substantially the same torque as the gas turbine engine 21 to the fan 11. In some cases, a ratio of a maximum power the electric motor 31 is able to output to a total maximal power of the aircraft power plant 10 ranges from 15% to 30%. A power of the electric motor 31 may be from 0.5 to 1 MW.

The fan 11 rotates within a plane being perpendicular to the central axis A1 of the gas turbine engine 21. Therefore, the fan 11 has two axial sides relative to the central axis A1 of the gas turbine engine 21, namely, an upstream axial side located upstream of the fan 11 relative to a flow F1 through the aircraft power plant 10 and a downstream axial side located downstream of the fan 11 relative to the flow F1. The upstream axial side may also be referred to as a forward side of the fan 11 relative to a direction of travel T of the aircraft 1 and the downstream axial side may also be referred to as a rearward side of the fan 11 relative to the direction of travel T of the aircraft 1. In the embodiment shown, the gas turbine engine 21 and an assembly of the gearbox 40 and the electric motor 31 are located on opposite axial sides of the fan 11. In this configuration, the electric motor 31 and the gearbox 40 are located on the upstream or forward axial side of the fan 11 whereas the gas turbine engine 21 is located on the downstream or rearward axial side of the fan 11. The gearbox 40 may be located axially between the electric motor 31 and the fan 11.

In the embodiment shown, the gearbox 40 is configured to combine inputs of both of the electric motor 31 and the gas turbine engine 21 to drive the fan 11. The gearbox 40 therefore defines a first load path P1 between the gas turbine engine 21 and the fan 11 and a second load path P2 between the electric motor 31 and the fan 11. The fan 11 may be in continuous driving engagement with both of the gas turbine engine 21 and the electric motor 31 along the first load path P1 and the second load path P2. The expression "continuous" in the context of the present disclosure implies that there is always a transfer of torque or power between both of the electric motor 31 and the fan 11 and between the gas turbine engine 21 and the fan 11 regardless of whether or not the gas turbine engine 21 and/or the electric motor 11 are providing or receiving torque or power. The disclosed aircraft power plant 10 may be devoid of a clutch or other engagement device to minimize weight of the aircraft power plant 10.

In the embodiment shown, the aircraft power plant 10 has a first configuration in which the electric motor 31 is in a generator mode. In this first configuration, the gas turbine engine 21 drives both of the electric motor 31 to generate electricity and the fan 11 to generate thrust along the first load path P1 and the second load path P2 of the gearbox 40. The aircraft power plant 10 has a second configuration in which the electric motor 31 is in a propelling mode. In this second configuration, the gas turbine engine 21 and the electric motor 31 conjointly driving the fan 11 along the first load path P1 and the second load path P2 of the gearbox 40. The expression "conjointly" in the context of the present disclosure implies that power or torque provided by the electric motor 31 and the gas turbine engine 21 may be combined to drive the fan 11. The gearbox 40 may receive an input solely from one of the gas turbine engine 21 and the electric motor 31 and drive both of the fan 11 and the other of the gas turbine engine 21 and the electric motor 31. Using the electric motor 31 to drive the gas turbine engine 21 may be used for starting the gas turbine engine 21. However, during cruise, the gas turbine engine 21 is expected to remain powered on at all time. Driving the electric motor 31 may be used to generate electricity.

Figure 3:
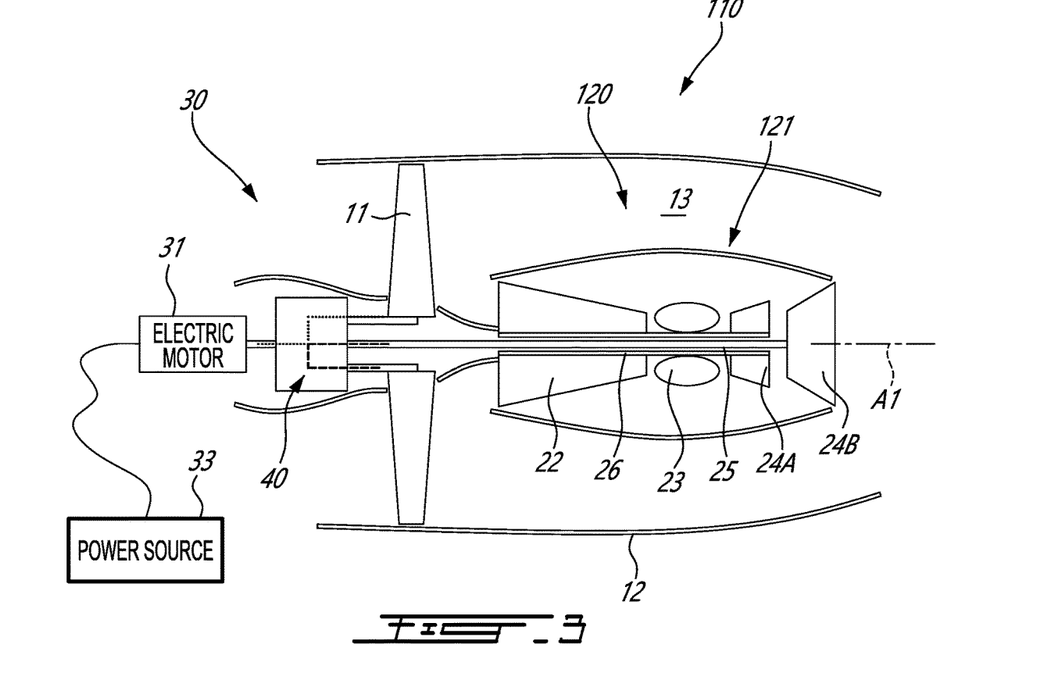
FIG. 3 is cross-sectional view of an aircraft power plant in accordance with another embodiment to be used with the aircraft of FIG. 1.

Referring to FIG. 3, another embodiment of an aircraft power plant is shown at 110. For the sake of conciseness, only features differing from the aircraft power plant 10 of FIG. 2 will be described here in below.

In this embodiment, the aircraft power plant 110 includes a thermal module 120 that also includes a gas turbine engine 121. However, in this configuration, the gas turbine engine 121 is a two-spool engine and includes the shaft 25 that is the low-pressure shaft and includes a high-pressure shaft 26. The low-pressure shaft 25 and the high-pressure shaft 26 rotate one relative to the other and are concentric. That is, one of the two shafts is disposed around the other. In this configuration, the turbine 24 includes a high-pressure turbine 24A and a power turbine 24B downstream of the high-pressure turbine 24A. The high-pressure turbine 24A is drivingly engaged to the compressor 22 and the low-pressure turbine 24B is drivingly engaged to the gearbox 40. It will be appreciated that the compressor 22 may include a low-pressure compressor engaged by the power turbine 24B and a high-pressure compressor downstream of the low-pressure compressor and engaged by the high-pressure turbine 24A.

Figure 4:
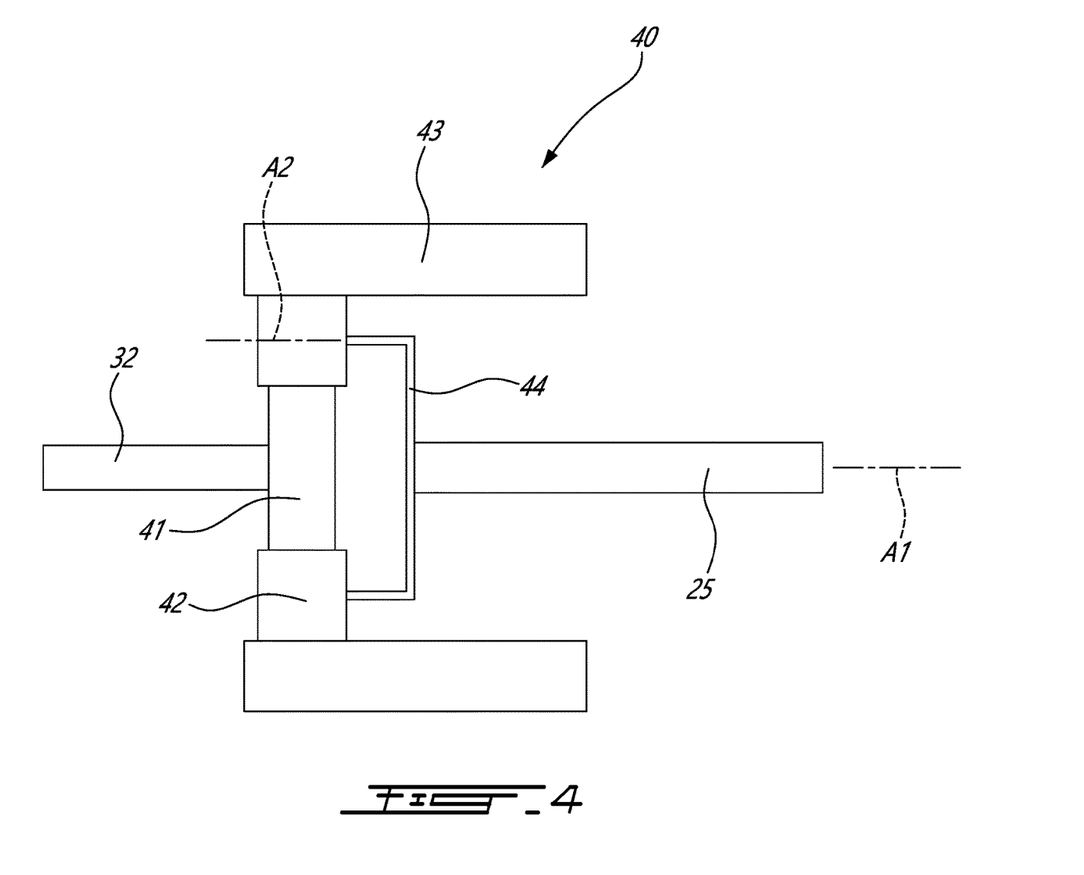
FIG. 4 is a cross-sectional view of a gearbox to be used with any of the aircraft power plants of FIGS. 2 and 3.

Referring now to FIG. 4, the gearbox 40 is described in more detail. In this embodiment, the gearbox 40 is a planetary gearbox and includes a sun gear 41, planet gears 42 disposed around the sun gear 41 and meshed with the sun gear 41, and a ring gear 43 extending around and meshed with the planet gears 42. A planet carrier 44 rollingly supports the planet gears 42. The planet gears 42 therefore rotate about the central axis A1 and about their respective individual rotation axes A2. In an exemplary implementation, the engine shaft 25 is drivingly engaged to the planet carrier 44, the motor shaft 32 of the electric motor 31 is drivingly engaged to the sun gear 41, and the fan 11 is drivingly engaged by the ring gear 43. The fan 11 may have a hub secured to the ring gear 43. For instance, a spline connection may be defined between an outer diameter of the ring gear 43 and an inner diameter of the hub. The gearbox 40 may include other kinds of gearbox and may include more than one planetary gear train.

In the present embodiment all components of the gearbox 40, that is, the sun gear 41, the planet gears 42, the ring gear 43, and the planet carrier 44 are free to rotate. That is, none of those components are blocked in rotation. The speed of the fan 11 may be controlled by controlling how much power/torque is extracted by or supplied to the electric motor 31. More detail about this aspect are presented below.

Referring back to FIG. 2, in one embodiment, power extraction/supply and speed of the electric motor 31 combined with a fuel flow to the gas turbine engine 21 may be used to control a thrust generated by the aircraft power plant 10. A controller 70 is operatively connected to the electric motor 31 and to a fuel system 80 of the gas turbine engine 21. The controller 70 is configured to cause the electric motor 31 to be operated either in a generator mode or in a propelling mode. In each mode, the controller 70 is able to control how much power is provided or extracted by the electric motor 31. The controller 70 is further operatively connected to the fuel system 80 to modulate a fuel flow from a source of fuel to the combustor 23 of the gas turbine engine 21.

Sensor(s) 71, such as a speed sensor, torque sensor, and so on may be operatively connected to the controller 70. These sensor(s) 71 are operable to generate signal indicative of operating parameters of the aircraft power plant 10. These operating parameters include, for instance, the rotational speed of the gas turbine engine 21, the rotational speed of the fan 11, the rotational speed of the electric motor 31, and so on. A fuel flow sensor may be used to measure a flow rate of fuel supplied to the gas turbine engine 21. Temperature and pressure sensors may be used to monitor running characteristics of the gas turbine engine 21.

For take-off and climb, a maximum fuel flow may be supplied to the gas turbine engine 21 along with a maximum or near maximum power from the electric motor 31 to produce maximum fan speeds/thrust. During cruise, the fuel flow to the gas turbine engine 21 may be reduced. The electric motor 31 may be switched between the generator mode and the propelling mode depending on electrical storage status and pilot demand. The controller 70 may aims to maintain a constant speed of rotation of the gas turbine engine 21 by modulating the fuel flow and the modes of the electric motor 31.

During an idle flight or descent, the fuel flow may be further reduced and the electric motor 31 may be switched to power extraction to maintain a substantially constant rotational speed of the gas turbine engine 21. When on ground and in idle, the fuel flow and electric motor 31 may be operated to optimize power extraction at minimum fuel flow and fan speed. The speed of the gas turbine engine 21 may be significantly different than in other operating modes.

In one embodiment, operating the aircraft power plant 10 in this way may facilitate a single spool design for mechanical simplicity and weight savings while not compromising aerodynamics and engine operability. Additionally, this may allow running the turbomachine in a narrow, more efficient operating speed range for additional fuel savings.

Figure 5:
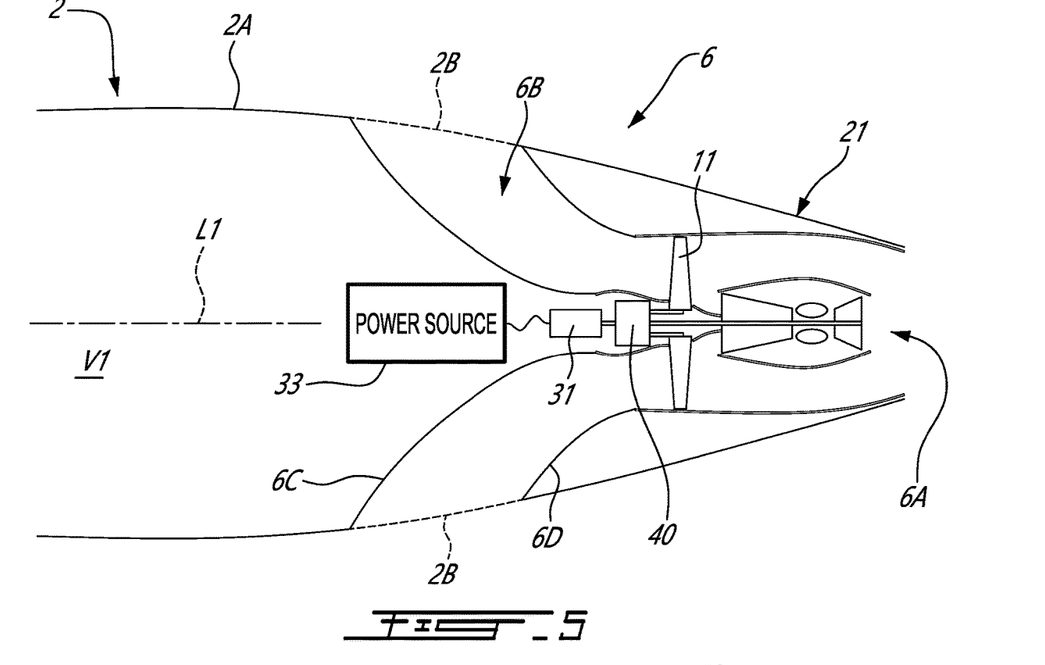
FIG. 5 is cross-sectional view of a possible implementation of the aircraft power plant of FIG. 2 into the aircraft of FIG. 1.

Referring now to FIG. 5, a possible implementation of the aircraft power plant 10 described above with reference to FIG. 3 into the tail section 6 of the fuselage 2 of the aircraft 1 of FIG. 1 is shown.

The fuselage 2 has a skin 2A that encloses an internal volume V1 of the fuselage 2. This internal volume V1 typically receives a payload, such as cargo and passengers of the aircraft 1. The skin 2A defines an air intake 2B within the tail section 6. The air intake 2B may extend annularly around a full circumference of a longitudinal axis L1 of the fuselage 2. Alternatively, the air intake 2B may include a plurality of openings defined through the skin 2A and circumferentially distributed around the longitudinal axis L1. As illustrated, the fuselage may have a cross-sectional area taken on a plane normal to the longitudinal axis L1 that is decreasing within the tail section 6. The air intake 2B may register with a portion of the tail section 6 that decreases in cross-sectional area. Therefore, the air intake may be within a boundary layer region of the fuselage 2 and may contribute in suctioning the boundary layer closer to the fuselage 2. This configuration may therefore reduce drag of the aircraft 1.

The aircraft power plant 10 is located within the tail section 6. The tail section 6 therefore defines an exhaust 6A or opening for expelling combustion gases generated by the gas turbine engine 21 and for expelling air propelled by the fan 11. The aircraft 1 therefore has a propelling engine, namely a turbofan, mounted inside the fuselage 2. The exhaust 6A may be defined by a rear edge of the skin 2A of the fuselage 2 and may have a substantially circular shape.

The gas turbine engine 21 and the fan 11 are in fluid flow communication with the air intake 2B of the fuselage 2. In the present embodiment, an intake conduit 6B extends from the air intake 2B to the exhaust 6A. The intake conduit 6B may be a single annular intake conduit or may include a plurality of conduits circumferentially distributed about the longitudinal axis L1 of the fuselage 2. The intake conduit 6B curves from the air intake 2B to the fan 11. Put differently, the intake conduit 6B is oriented substantially radially relative to the longitudinal axis L1 of the fuselage 2 at the air intake 2B and is oriented substantially axially relative to the longitudinal axis L1 at the fan 11. An axial component of the intake conduit 6B therefore increases from the air intake 2B to the fan 11 along a direction of the flow within the intake conduit 6B.

Still referring to FIG. 5, in the disclosed embodiment, the electric motor 31 and the gearbox 40 are located radially inwardly of the intake conduit 6B. The intake conduit 6B is defined radially between a radially-inner wall 6C and a radially-outer wall 6D relative to the longitudinal axis L1. The electric motor 31 and the gearbox 40 are located inwardly of the radially-inner wall 6C.

Figure 6:
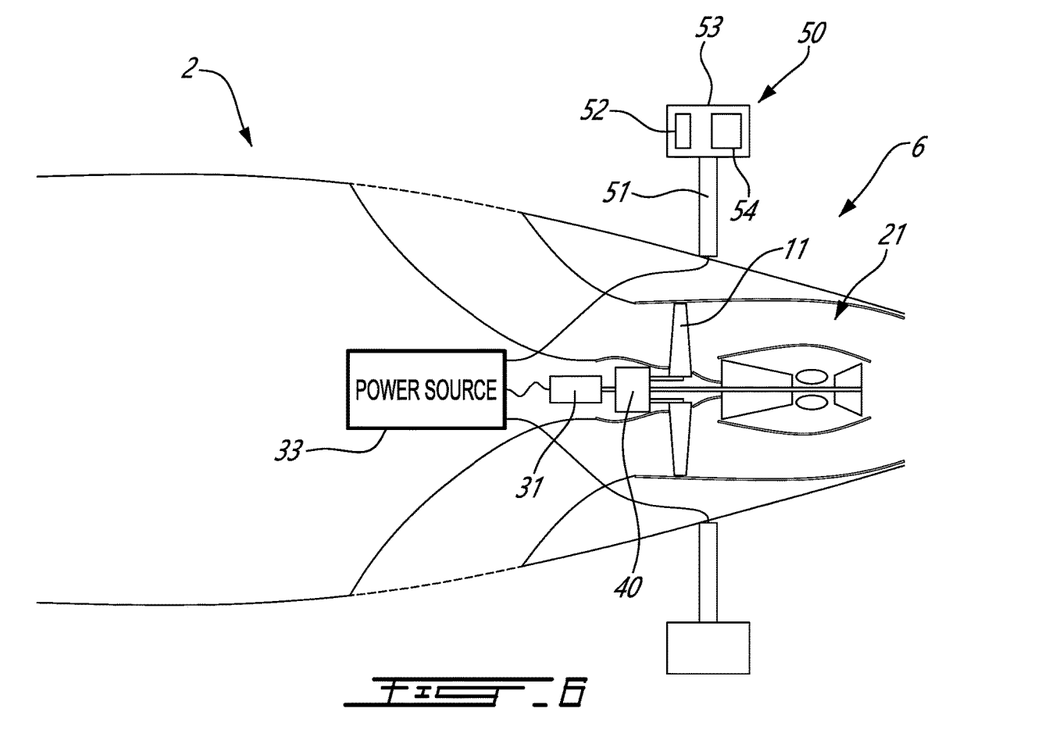
FIG. 6 is a cross-sectional view of another possible implementation of the aircraft power of FIG. 2 into the aircraft of FIG. 1 and including supplementary propulsors.

Referring now to FIG. 6, in this embodiment, the aircraft 1 is equipped with the aircraft power plant 10 described above with reference to FIGS. 2 and 5. In this embodiment, secondary propulsors 50 are mounted to the tail section 6 of the fuselage 2. The secondary propulsors 50 may be ducted fan, which include a fan surrounded by a stationary duct such that the fan rotates relative to the stationary duct. Pylons 51 are used to mount the secondary propulsors 50 to the fuselage 2. The secondary propulsor 50 may thus include a fan 52 mounted within a duct 53 and drivingly engaged by an electric motor 54 operatively connected to the power source 33.

It will be appreciated that the aircraft power plant 110 of FIG. 3, which is a two-spool engine, may also be implemented in to the tail section 6 of the fuselage 2 as described herein above.

Figure 7A:
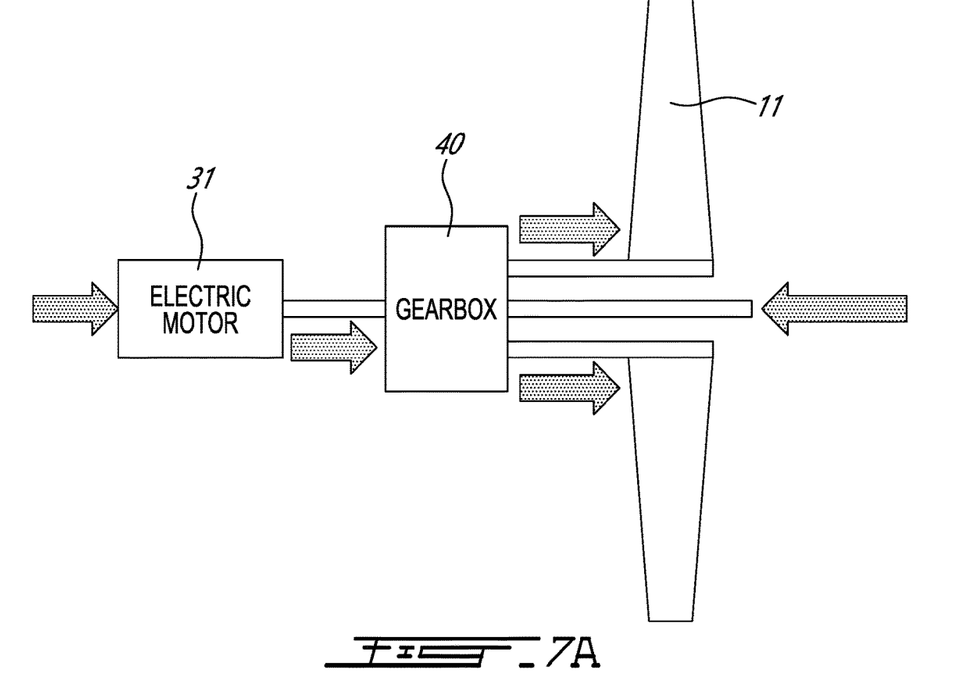
FIG. 7A is a cross-sectional view of a portion of the aircraft power plant of FIG. 2 in a first configuration.
Figure 7B:
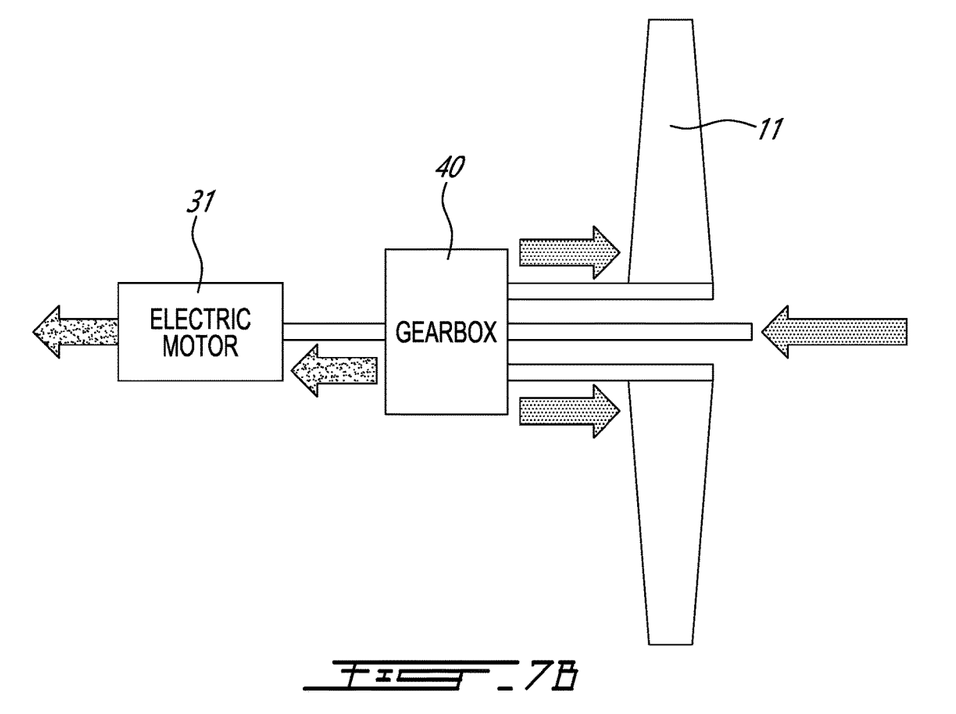
FIG. 7B is a cross-sectional view of a portion of the aircraft power plant of FIG. 2 in a second configuration.

Referring now to FIGS. 7A and 7B, the two modes of operations of the aircraft power plant are illustrated.

FIG. 7A depicts the mode of operation when the electric motor 31 is in a propelling configuration. As illustrated, power is provided to the fan 11 by both of the electric motor 31 and the gas turbine engine 21 via the gearbox 40. The fan 11 therefore receives power from both the electric motor 31 and the gas turbine engine 21 as denoted with the arrows. FIG. 7B depicts the mode of operation when the electric motor 31 is in a generator configuration. As illustrated, power is provided to the fan 11 solely by the gas turbine engine 21 via the gearbox 40. The electric motor 31 acting as a generator and receives power from the gas turbine engine 21 via the gearbox 40 as illustrated with the arrows.

Figure 8:
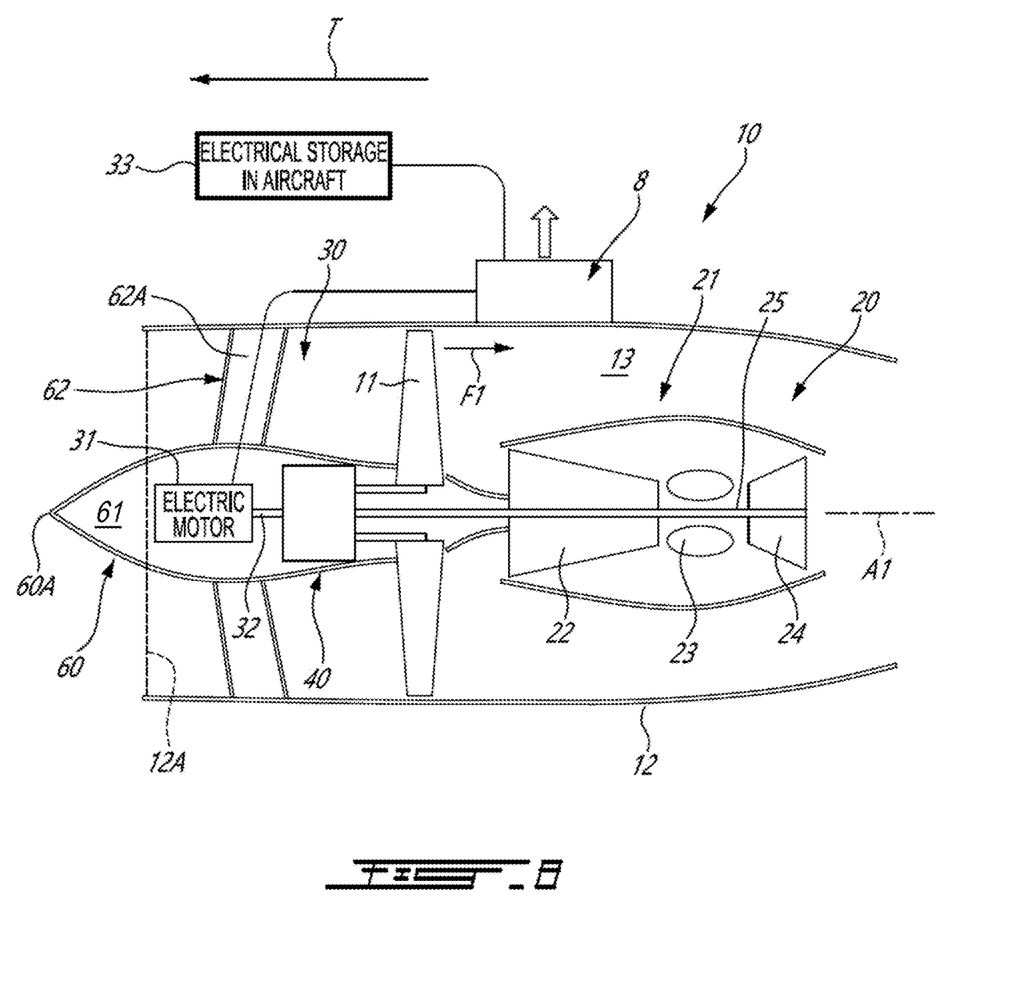
FIG. 8 is cross-sectional view of a possible implementation of the aircraft power plant of FIG. 2 to a wing of the aircraft of FIG. 1.

Referring now to FIG. 8, a possible implementation of the aircraft power plant 10 of FIG. 2 to one of the wings 3 of the aircraft 1 is shown.

The aircraft power plant 10 may be mounted to the wing 3 via a pylon 8. The pylon 8 may be secured to the duct 12. In the embodiment shown, the aircraft power plant includes a nose cone 60 that is centered relative to the central axis A1 and that defines an internal space 61. The nose cone 60 is non-rotating relative to the duct 12. The nose cone 60 has an apex 60A that may be located forward of a inlet plane 12A of the duct 12 relative to the direction of travel T. This may minimize inlet distortion and drag. The gearbox 40 and the electric motor 31 are received within the internal space 61 of the nose cone 60 and are secured to the nose cone 60. The nose cone 60 is secured to the duct 12 via struts 62 that are circumferentially distributed about the central axis A1. One or more of the struts 62 may define an internal passage 62A to receive wiring for electrically connecting the electric motor 31 to the power source 33, which may be located within the fuselage 2 or within the wings 3 of the aircraft 1. The struts 62 have an aerodynamic profile to minimize drag.

The disclosed aircraft power plans may be more efficient than a traditional turbofan engine. For the single spool configuration of FIG. 2, weight savings may be obtained since only one shafts and less bearings and bearing housings are required. Moreover, one of the reason turbofan engine uses two spools is to have a low-pressure spool, which drives the fan 11, rotating at a lower speed than the high-pressure spool. In the configuration of FIG. 2, which depicts a single spool engine, it may not be necessary to use two spool since the lower rotational speed of the fan 11 is achieved via the gearbox 40. This may lead to efficiency gains.

In this configuration, both of the electric motor 31 and the gas turbine engine 21 may drive the fan 11 during a phase of flight requiring high thrust, such as during take-off and climb. The electric motor 31 may thus be used to supplement the power of the gas turbine engine 21, which is sized for thrust requirements during cruise, rather than take-off. This further permits weight reduction. Moreover, even when the thrust demand is lower, the gas turbine engine 21 may be operated near or at its point of maximum efficiency with the excess power absorbed by the electric motor 31 being operated as a generator and stored in the power source 33. In the single spool engine, the gearbox 40 allows both of the turbine and the fan to rotate at their optimal speed, which are different from one another without introducing a second spool. Although, in some cases, a two-spool engine may be used.

The disclosed configurations includes a large motor/generator installed near the fan 11 of the gas turbine engine 21 for optimum performance. As a result, this concept may lend itself well to being installed in the aircraft fuselage and to take advantage of the boundary layer ingestion fan concept as described above with reference to FIG. 5. This may improve overall aircraft aerodynamics and may allow the engine architecture to take advantage of the aircraft structure to support the motor/generator components as opposed to a typical wing or tail mounted engine configuration. It may be possible to mount the aircraft power plants of the present disclosure to the wings of the aircraft or to the fuselage. Installing the disclosed power plants within the fuselage of the aircraft may enable much shorter cable lengths between the engine and energy storage devices for improved electrical efficiency.

This concept may be beneficial on the controller aspect. Indeed, on a traditional turbofan engine, the control parameters available are typically the fuel flow and variable geometry (VGVs, nozzle area, etc). With the disclosed aircraft power plants, the controller may use an additional control parameter to modulate engine thrust. This parameter may be the amount of power supplied or absorbed by the motor generator to modulate the engine thrust. This may introduce a range of possibilities for advanced engine control to improve the reliability and efficiency of the overall engine.

The disclosed aircraft power plants may replace a traditional auxiliary power unit (APU). This may improve the overall weight of the aircraft. Since this concept requires a large electrical motor/generator as well as a substantial electrical storage device, it would be possible to run this hybrid-electric turbofan engine in "APU Mode" where the majority of the power created by the gas turbine engine is directed to the electric motor 31 to charge the power source 33 and power the aircraft's ground systems. This concept engine would also be able to start itself. This may remove the need for APU assist during start-up.

Figure 9:
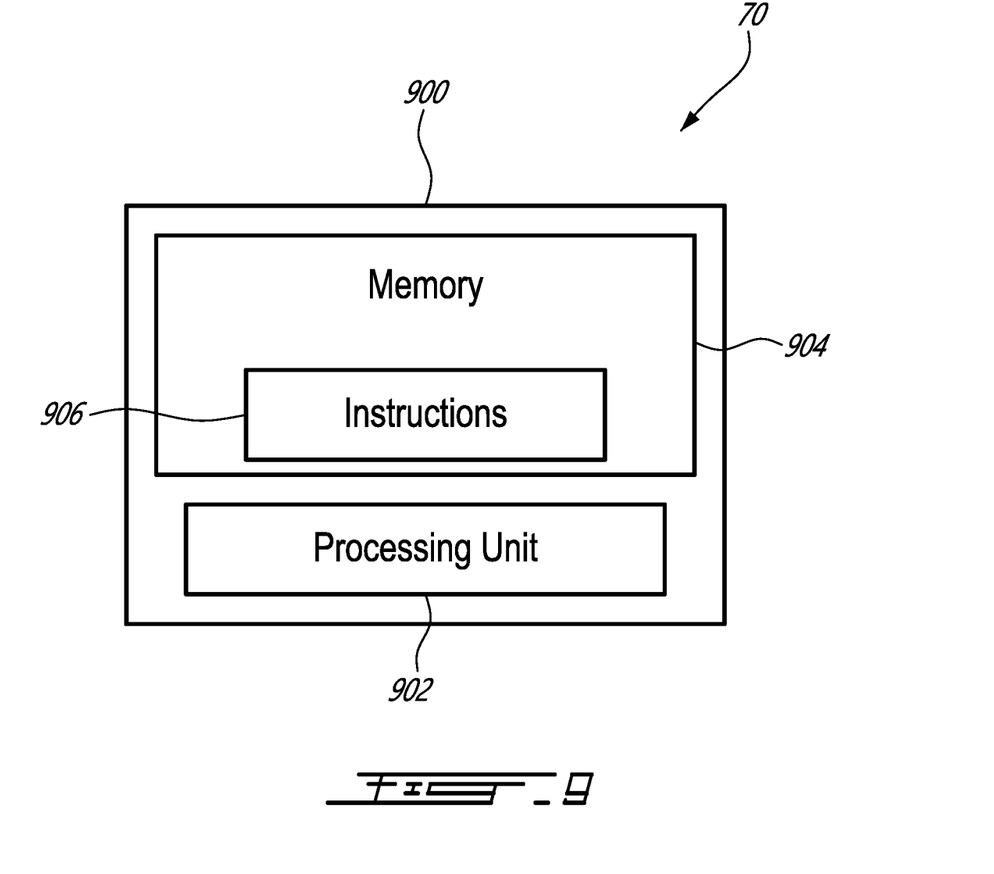
FIG. 9 is a schematic representation of a controller in accordance with one embodiment.

With reference to FIG. 9, an example of a computing device 900 is illustrated. For simplicity only one computing device 900 is shown but the system may include more computing devices 900 operable to exchange data. The computing devices 900 may be the same or different types of devices. The controller 70 may be implemented with one or more computing devices 900. Note that the controller 70 can be implemented as part of a full-authority digital engine controls (FADEC) or other similar device, including electronic engine control (EEC), engine control unit (ECU), electronic propeller control, propeller control unit, and the like. In some embodiments, the controller 70 is implemented as a Flight Data Acquisition Storage and Transmission system, such as a FAST™ system. The controller 70 may be implemented in part in the FAST™ system and in part in the EEC. Other embodiments may also apply.

The computing device 900 comprises a processing unit 902 and a memory 904 which has stored therein computer-executable instructions 906. The processing unit 902 may comprise any suitable devices configured to implement the method of operating the aircraft power plant such that instructions 906, when executed by the computing device 900 or other programmable apparatus, may cause the functions/acts/steps performed as part of the method of operating the aircraft power plant as described herein to be executed. The processing unit 902 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 904 may comprise any suitable known or other machine-readable storage medium. The memory 904 may comprise non-transitory computer readable storage medium, for example, but not limited to, an electronic, magnetic, optical, electromagnetic, infrared, or semiconductor system, apparatus, or device, or any suitable combination of the foregoing. The memory 904 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 904 may comprise any storage means (e.g., devices) suitable for retrievably storing machine-readable instructions 906 executable by processing unit 902.

The methods and systems for of operating the aircraft power plant described herein may be implemented in a high level procedural or object oriented programming or scripting language, or a combination thereof, to communicate with or assist in the operation of a computer system, for example the computing device 900. Alternatively, the methods and systems for operating the aircraft power plant may be implemented in assembly or machine language. The language may be a compiled or interpreted language. Program code for implementing the methods and systems for operating the aircraft power plant may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating the aircraft power plant may also be considered to be implemented by way of a non-transitory computer-readable storage medium having a computer program stored thereon. The computer program may comprise computer-readable instructions which cause a computer, or more specifically the processing unit 902 of the computing device 900, to operate in a specific and predefined manner to perform the functions described herein, for example those described in the method of operating the aircraft power plant.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft power plant, comprising:
   a fan for providing power to an aircraft;
   a gas turbine engine located on a first axial side of the fan relative to a central axis of the gas turbine engine, the gas turbine engine having a compressor and a turbine, the turbine drivingly engaged by an engine shaft;
   an electric motor powered by a power source, the electric motor driving a motor shaft; and
   a gearbox located on a second axial side of the fan opposite the first axial side, the gearbox in driving engagement with the engine shaft, the motor shaft, and the fan, the gearbox defining a first load path between the gas turbine engine and the fan and a second load path between the electric motor to the fan, the fan in continuous driving engagement with both of the gas turbine engine and the electric motor along the first load path and the second load path.

2. The aircraft power plant of claim 1, wherein the first axial side corresponds to a downstream side of the fan relative to an airflow through the fan, the second axial side corresponding to an upstream side of the fan relative to the airflow.

3. The aircraft power plant of claim 1, comprising a duct extending circumferentially around both of the fan and the gas turbine engine.

4. The aircraft power plant of claim 1, wherein the gearbox is a planetary gearbox having a sun gear, planet gears meshed with the sun gear and rollingly supported by a planet carrier, and a ring gear meshed with the planet gears.

5. The aircraft power plant of claim 4, wherein the engine shaft is drivingly engaged to the planet carrier, the motor shaft is drivingly engaged to the sun gear, and the fan is drivingly engaged by the ring gear.

6. The aircraft power plant of claim 1, comprising:
   a first configuration in which the electric motor is in a generator mode, the gas turbine engine driving both of the electric motor and the fan in the first configuration along the first load path and the second load path; and
   a second configuration in which the electric motor is in a propelling mode, the gas turbine engine and the electric motor conjointly driving the fan in the second configuration and the first load path and the second load path.

7. The aircraft power plant of claim 1, wherein the gas turbine engine is a single spool engine.

8. The aircraft power plant of claim 1, wherein the electric motor is located on the second axial side of the fan.

9. The aircraft power plant of claim 8, wherein the gearbox is located axially between the electric motor and the fan.

10. An aircraft comprising:
    a fuselage having a skin enclosing an internal volume of the fuselage, the fuselage having a tail section, the skin defining an air intake within the tail section;
    a power plant located within the tail section, the power plant having:
      a fan for providing power to the aircraft, the fan in fluid flow communication with the air intake of the tail section;
      a gearbox drivingly engaged with the fan;
      a gas turbine engine drivingly engaged with the gearbox and in fluid flow communication with the air intake of the tail section;

an electric motor drivingly engaged with the gearbox, the gearbox and the electric motor located forward of the fan relative to a direction of travel of the aircraft; and wherein the fan is in continuous driving engagement with both of the gas turbine engine and the electric motor via the gearbox, the fan is driven by one or more of the gas turbine engine and the electric motor through the gearbox.

11. The aircraft of claim 10, wherein the tail section defines an intake conduit extending from the air intake to the fan, the intake conduit curving from the air intake to the fan.

12. The aircraft of claim 10, wherein the tail section has an opening at a rear end thereof, the gas turbine engine and the fan in fluid flow communication with the opening.

13. The aircraft of claim 10, wherein the tail section has a converging portion that extends towards a longitudinal axis of the fuselage, the air intake located within the converging portion.

14. The aircraft of claim 10, wherein the gearbox is a planetary gearbox having a sun gear, planet gears meshed with the sun gear and rollingly supported by a planet carrier, and a ring gear meshed with the planet gears.

15. The aircraft of claim 14, wherein the gas turbine engine is drivingly engaged to the sun gear, the electric motor is drivingly engaged to the planet carrier, and the fan is drivingly engaged by the ring gear.

16. The aircraft of claim 10, wherein the gas turbine engine is a single spool engine.

17. The aircraft of claim 10, comprising secondary propulsors mounted to the tail section of the fuselage.

18. The aircraft of claim 17, wherein the secondary propulsors are ducted fans each drivingly engaged by a respective electric motor.

19. The aircraft of claim 10, wherein the power plant has:
a first configuration in which the electric motor is in a generator mode, the gas turbine engine driving both of the electric motor and the fan in the first configuration; and
a second configuration in which the electric motor is in a propelling mode, the gas turbine engine and the electric motor conjointly driving the fan in the second configuration.

* * * * *